(12) United States Patent
Birmanns

(10) Patent No.: US 12,553,481 B2
(45) Date of Patent: Feb. 17, 2026

(54) BRAKE DEVICE

(71) Applicant: Thomas Birmanns, Balingen (DE)

(72) Inventor: Thomas Birmanns, Balingen (DE)

( * ) Notice: Subject to any disclaimer, the term of this patent is extended or adjusted under 35 U.S.C. 154(b) by 599 days.

(21) Appl. No.: 17/503,298

(22) Filed: Oct. 16, 2021

(65) Prior Publication Data

US 2022/0056967 A1 Feb. 24, 2022

Related U.S. Application Data

(63) Continuation of application No. PCT/DE2021/100098, filed on Feb. 2, 2021.

(30) Foreign Application Priority Data

Mar. 4, 2020 (DE) .................... DE102020105874.8

(51) Int. Cl.
| | |
|---|---|
| F16D 63/00 | (2006.01) |
| F16D 65/22 | (2006.01) |
| A61G 5/10 | (2006.01) |
| B60T 1/00 | (2006.01) |
| F16D 125/30 | (2012.01) |

(52) U.S. Cl.
CPC .......... F16D 63/006 (2013.01); F16D 65/22 (2013.01); *A61G 5/1032* (2013.01); *B60T 1/005* (2013.01); *F16D 2125/30* (2013.01)

(58) Field of Classification Search
CPC ......... B60T 1/005; B60T 1/04; A61G 1/0293; A61G 5/10; A61G 5/101; A61G 5/1027; A61G 5/1032; F16D 63/006; F16D 65/22; F16D 2125/30
See application file for complete search history.

(56) References Cited

U.S. PATENT DOCUMENTS

| | | | | |
|---|---|---|---|---|
| 1,533,790 A | * | 4/1925 | Dymock ................. | F16D 51/42 188/323 |
| 1,561,905 A | * | 11/1925 | Brown .................... | F16D 51/42 188/335 |
| 1,619,718 A | * | 3/1927 | Girling ................... | F16D 65/08 188/234 |

(Continued)

FOREIGN PATENT DOCUMENTS

| | | | |
|---|---|---|---|
| CN | 108095914 A | * | 6/2018 |
| DE | 521091 C | | 3/1931 |

(Continued)

*Primary Examiner* — Nicholas J Lane
*Assistant Examiner* — Mahbubur Rashid
(74) *Attorney, Agent, or Firm* — Von Rohrscheidt Patents

(57) ABSTRACT

A brake device including a brake unit; a contact device engageable by the brake unit and movable relative to the brake unit, wherein the brake unit includes at least one activation device and at least one brake member that includes a transmission member and a brake shoe that is pivotably supported in a pivot bearing at an end of the at least one brake member, wherein the at least one activation device engages the transmission member to move the at least one brake member towards the contact device until the brake shoe contacts the contact device in an activation position of the at least one brake member and the brake shoe, wherein the pivot bearing is arranged at the at least one brake member so that the pivot bearing is movable towards the contact device together with the transmission member.

20 Claims, 2 Drawing Sheets

(56) References Cited

U.S. PATENT DOCUMENTS

| | | | | |
|---|---|---|---|---|
| 1,773,120 | A * | 8/1930 | Richter | F16D 51/12 188/335 |
| 1,972,643 | A * | 9/1934 | Chapman | F16D 43/22 192/105 R |
| 2,002,785 | A * | 5/1935 | Melling | F16D 51/32 188/78 |
| 2,031,742 | A * | 2/1936 | Smith | F16D 65/52 188/335 |
| 2,588,482 | A * | 3/1952 | Chapman | F16D 43/18 192/105 CD |
| 2,970,680 | A * | 2/1961 | Cain | F16D 43/18 192/114 R |
| 3,021,923 | A * | 2/1962 | Burnett | F16D 65/42 188/78 |
| 3,078,972 | A * | 2/1963 | Davis | F16D 67/02 192/75 |
| 3,208,571 | A * | 9/1965 | Bochory | F16D 43/18 192/105 CD |
| 3,224,541 | A * | 12/1965 | Yamamoto | F16D 43/22 192/105 CD |
| 4,231,237 | A * | 11/1980 | Bochan | F16D 43/18 192/105 CD |
| 7,108,118 | B2 * | 9/2006 | Tani | F16D 43/18 192/105 CD |
| 7,124,858 | B2 * | 10/2006 | Ikegami | A61G 5/1035 280/250.1 |
| 7,380,280 | B2 * | 5/2008 | de Jong | H04W 12/02 726/26 |
| 8,408,367 | B2 | 4/2013 | Hofmann et al. | |
| 8,657,089 | B2 * | 2/2014 | Yang | F16D 43/21 192/54.52 |
| 8,689,948 | B2 * | 4/2014 | Winkler | B23Q 11/0092 192/105 CD |
| 8,998,330 | B2 * | 4/2015 | Ito | B60N 2/236 297/367 L |
| 9,599,174 | B2 * | 3/2017 | Kaku | F16D 51/12 |
| 10,414,295 | B2 * | 9/2019 | Maeda | B60N 2/236 |
| 10,610,018 | B1 * | 4/2020 | Madhu | A47C 1/027 |
| 10,857,048 | B2 * | 12/2020 | You | B60T 7/12 |
| 2005/0168034 | A1 * | 8/2005 | Fast | B60N 2/2362 297/367 R |
| 2011/0233010 | A1 * | 9/2011 | Drewes | F16D 51/10 188/335 |
| 2012/0161488 | A1 * | 6/2012 | Ishihara | B60N 2/236 297/367 R |
| 2014/0125096 | A1 * | 5/2014 | Barzen | B60N 2/22 297/216.13 |

FOREIGN PATENT DOCUMENTS

| | | |
|---|---|---|
| DE | 9001251 U1 | 4/1990 |
| DE | 19857786 C2 | 5/2000 |
| DE | 102010014862 A1 | 10/2011 |
| DE | 102016212618 A1 * | 1/2018 |
| DE | 102016218586 B1 * | 10/2019 |
| DE | 102018111567 A1 | 11/2019 |
| DE | 102018129157 A1 | 5/2020 |
| EP | 0528235 B1 | 10/1995 |
| EP | 0699550 A2 | 3/1996 |
| GB | 214564 A | 4/1924 |
| WO | WO2014198312 A1 | 12/2014 |

\* cited by examiner

BRAKE DEVICE

RELATED APPLICATIONS

This application is a continuation of International Patent Application PCT/DE2021/100098 filed on Feb. 2, 2021 which claims priority from German Patent Application DE 10 2020 105 874.8 filed on Mar. 4, 2020.

FIELD OF THE INVENTION

The invention relates to a brake device

BACKGROUND OF THE INVENTION

A generic brake device is known from the German patent application DE 10 2018 111 567 A1, which discloses a drive arrangement for a wheel of a wheel chair or similar, including an electric drive and a brake arrangement. The brake arrangement includes a fixed inner brake element and an outer brake element that rotates together with a wheel, wherein the brake elements are movable relative to each other in an axial or radial direction and one of the brake elements presses against the other brake element directly or indirectly through spring loading when the brake is locked. The brake elements are retained at an offset from each other indirectly or directly by a retaining element even when the brake is unlocked. This brake device forms part of a brake unit wherein inner brake elements are pulled in a radially inward direction by a transfer mechanism when the brake is unlocked. When the mechanism is activated the inner brake elements are pressed in a radially outward direction so that the inner brake elements engage the outer brake element and perform the braking. This brake device is suitable for a locking brake. However, the inner brake elements that engage the outer brake elements are rigid so that the described brake device does not assure reliable locking during emergency braking.

Tooth brakes or tooth couplings are efficient switchable devices for holding or braking a load at slow speeds, typically up to 20 RPM, c.f. Thompsonlinear.com, TC/TCR/TCP tooth couplings and tooth brakes.

At higher speeds reliable locking is not assured anymore since the tooth crests touch during engagement so that reliable locking is not provided anymore. Therefore, tooth couplings and tooth brakes are almost exclusively used for switching or breaking at a standstill or during substantially synchronous running.

Disengagement is also possible under full load and at full speed. However, this requires increased forced application since the friction forces of the tooth flanks relative to each other under load are correspondingly high.

Coupling and brake devices of the type recited supra can be used in known applications like printing machinery, packaging machinery, dynamometers, machine tools and textile machinery. Additional applications are locking brakes in motor vehicles, elevator drives and similar.

Coupling and brake devices of this type are particularly suited for wheel chairs for handicapped persons.

Typical wheel chair drives accelerate or brake the wheel chair advantageously to a standstill using a DC motor. Additionally, most wheel chair drives include a safety brake. The safety brake is used to bring the wheel chair to a reliable stop at any time and keep the wheel chair reliably stopped. Typically, this brake engages only when the vehicle is stopped, thus when the drive command is set to zero by the user or when the vehicle is switched off. In this case the brake acts as a locking brake. In a special case e.g., during an emergency the motor does not break the vehicle to a standstill. This can happen when a failure occurs or current is interrupted. In this case the brake has to engage automatically to bring the vehicle to a reliable stop. For example, when a wheel chair drives downhill and a failure occurs the wheel chair must come to a reliable stop in a predetermined stop distance. In case the wheel chair cannot be driven any further by the propulsion system thereafter the brake must be releasable with a small amount of force in order to enable manual propulsion of the wheel chair.

Safety brakes therefore typically are spring preloaded friction brakes, so called spring pressure brakes that are released by an electro magnet. Without electrical current the brake is locked.

Brake devices for hub drives or motor driven wheel chairs are known e.g. from EP 0 528 235 B1 and EP 0 699 550 A2.

DE 198 57 786 C2 discloses a variation of a wheel chair drive that does not require a brake device.

EP 0 699 550 A2 discloses a hub drive for driven wheels of a small vehicle, in particular a wheel chair. The device includes a DC motor configured as an outrunner motor wherein the outrunner forms the wheel hub or the rim of the running wheel. The stator of the DC motor is fixed at the vehicle through a brake housing. Additionally, this device includes a central electro magnetically and manually ventilatable or unlockable spring pressure brake which brakes the hub drive device when the power fails. Manually releasing the brakes simultaneously functions as uncoupling into freewheeling in order to facilitate manual propulsion of the wheel chair Since the brake is configured as a friction brake, the friction brake has to impart the same torque during braking which is supplied by the motor during propulsion. In order to provide the required high pressing forces an electro magnet is required for an electromagnetic brake wherein the electromagnet is very large and heavy. Corresponding drives for wheel chairs are hardly ever used since this configuration is heavy and expensive.

EP 0 528 235 B1 discloses a hub drive including an AC motor including a runner, a planetary transmission, a spring brake that impacts the runner and that is only releasable electromagnetically and a coupling, wherein the device is configured as a drive element of a large running wheel of a wheel chair. The torque provided by the runner of the DC motor is transferred through the planetary transmission to the planet gear carrier that is supported in roller bearings and from there through a coupling to the hub body. The coupling can be unlocked manually so that the wheel chair can free wheel. Thus, the wheel chair can also be propelled manually, e.g.; by grip rings or by pushing. It is an advantage of the hub drive that the required brake can be kept small since the brake torque is reinforced by the planetary transmission. This configuration is smaller and lighter than the configuration of EP 0 699 550 A2, however it is also much more complex and failure prone.

It is another advantage of this configuration that the form locking coupling of the hub drive does not lock in any random position and is very difficult to unlock under load. This is the case in particular when the wheel chair is located on a hill, a mountain or a ramp.

The German patent DE 198 57 786 C2 also discloses a hub drive, however for residual force augmenting drives so that a brake device can be omitted in its entirety. However, this is a substantial safety hazard so that a brake is required by regulation in wheel chairs with so called drive command input devices which can be controlled e.g.; by a joy stick.

The brake devices described supra disclosed in EP 0 528 235 B1 and EP 0 699 550 A2 are locking brakes by configuration. Thus, they only become active when the respective drive comes to a standstill. During general driving this condition is caused by the motor which can accelerate and brake. Brake force control for a locking brake of this type is known e.g.; from a bicycle brake is not required in this application, Thus, the brake is either unlocked or locked.

Additional documents known to persons skilled in the art are

DE 90 01 251 U1, WO 2014/198 312 A1, DE 10 2010 014 862 A1, DE 521 091 A, GB 214 564 A and DE 10 2018 129 157 A1.

All the devices known in the art struggle with the problem of providing reliable locking, simple unlocking under load and braking while in motion while keeping the device compact, light and inexpensive.

BRIEF SUMMARY OF THE INVENTION

Thus, it is an object of the invention to provide a brake device which functions as a locking brake as well as an emergency brake, which uses the actual movement force for deceleration and which is compact, light and inexpensive to produce.

A brake device including a brake unit; a contact device engageable by the brake unit and movable relative to the brake unit, wherein the brake unit includes at least one activation device and at least one brake member that includes a transmission member and a brake shoe that is pivotably supported in a pivot bearing at an end of the at least one brake member, wherein the at least one activation device engages the transmission member to move the at least one brake member towards the contact device until the brake shoe contacts the contact device in an activation position of the at least one brake member and the brake shoe, wherein the pivot bearing is arranged at the at least one brake member so that the pivot bearing is movable towards the contact device together with the transmission member, wherein the brake shoe is actuatable from the activation position into an extreme position by a transversal force imparted by the contact element that acts transversal to a direction of actuation of the pivot bearing through the brake shoe that is arranged at an end of the pivot bearing so that a torque at the contact device and a force that acts in a direction of rotation of the contact device cause a brake shoe torque at the brake shoe, Advantageous embodiments of the brake device can be derived from the subsequent dependent claims.

The brake device according to the invention includes a brake unit and a contact element that is movable relative to the brake unit and that is configured to engage the brake unit. Additionally, the brake unit includes at least one activation element and at least one brake element wherein the activation element engages a transmission element in order to displace the brake element towards the contact element until the contact element is contacted by the brake shoe. The object of the invention is characterized in that the brake element includes at least one brake shoe wherein the at least one brake shoe is connected with a movable transmission element through an actuation element. The actuation element enables the brake element to displace and lightly contact the contact element due to the transversal force that is applied by the contact element and thus to reinforce the braking force impacting the contact element until the contact element comes to a standstill. The transmission element is movable towards the contact element by an activation element so that the transmission element is initially retained in an idle position and movable into an activation position thereafter. Due to the actuation element, it is possible to release the brake again by resetting the transmission element when the transversal force has ceased so that a blocking the brake is rendered impossible.

Thus, a brake device is described supra that is configured to initiate a braking process reliably and with a small amount of input energy. No energy has to be expended in order to press the brake element against the contact element. Energy only has to be expended in order to actuate the brake element to engage the contact element. On the other hand, side, the brake can be released with a small amount of energy application in a reverse direction after the braking has been performed.

The actuation element can have various different configurations. A first embodiment is configured with a brake shoe that pivots about a pivot bearing so that the actuation is performed due to slanting caused by pivoting. Since movement of the brake shoe caused by the transversal force of the contact element causes a pivoting of the brake shoe about the pivot bearing, a force axis is extended by the pivoting when the pivot bearing enables rotation about a pivot point between a center of an outer radius of the brake shoe and its outer edge in a portion of the outer radius of the brake shoe. In this case a direct distance between the pivot bearing and the contact element increases during actuation and a brake effect relative to the contact element is achieved.

Furthermore, the brake shoe can have an outer radius that is smaller than an inner radius of the contact element. This facilitates a pivoting of the brake shoe when the brake shoe is contacted by the contact element so that the outer radius of the brake shoe rolls on the inner radius of the contact element. The inner radius of the contact element can also diverge into infinity when the contact element is elongated.

When actuating the activation element, the activation element pushes the transmission element towards the contact element until the brake element engages the contact element through the brake shoe. Thus, a movement force of the contact element is transmitted through the pivot bearing to the transmission element when the contact element contacts the brake shoe so that the brake unit in its entirety reacts the movement force. Thus, a lever arm of the brake element is extended by pivoting the brake shoe about the pivot bearing which eventually increase the brake effect by absorbing a larger amount of the movement force of the contact element. Put differently the more the brake shoe is deflected about the pivot bearing by the contact element the stronger the brake force impacting the contact element.

The brake element contacts the activation element, is supported thereon and reacts absorbed movement force into the contact element. Thus, the brake element can be advantageously configured rigid in order to react the force essentially completely and to facilitate a short and effective braking process. The movement force thus introduced eventually impacts the contact element as braking force. As long as the brake unit is in contact with the contact element and the contact element is in motion the force of the contact element is transferred to the brake element and thus to the brake unit until the contact element comes to a standstill. Thus, a vehicle can be brought to a standstill merely due to its motion when an emergency braking process is initiated.

When the brake device described supra is used as a locking brake, the brake shoe of the brake element engages the engagement of the contact element by rotating the activation element through the transmission element and the pivot bearing but the brake shoe itself does not build up any pressure against the contact element. This occurs only due to the movement of the contact element and a resulting rolling of the brake shoe on the contact element.

Thus, the actuation element can also have a slope in addition to being configured as a pivot bearing wherein a bearing of the brake shoe is moved along the slope towards the contact element. Also here the transversal force of the contact element that is to be reduced by the brake is initially used as an actuation means before the brake tightens more and more by itself during the actuation. Any other form of movement besides pivoting or linear movement is conceivable. A movement along any curved path is possible and provides an option to adjust brake characteristics.

Advantageously a reset element can be associated with the actuation element wherein the reset element resets the actuation element back into its activation position when the braking process is completed, thus when the transversal force has ceased and/or when the activation element is reset. This facilitates triggering the brake multiple times without external interference.

In an advantageous embodiment of the invention, the brake shoe and the contact element can respectively include a complementary interlocking element. This increases a contact surface that is created when the brake shoe engages the contact element which provides a higher amount of force transmission. Advantageously the interlocking element can be a teething including one or plural teeth. In a particularly advantageous embodiment, the teething can have flat tooth flanks, advantageously with an angle of 45 degrees at the most. However, it is also possible to configure the interlocking element as a mere friction surface without teething or micro teething.

In order to reduce wear and increase a grip of the teething the interlocking element can be fabricated from metal and/or a synthetic material in an advantageous embodiment.

Furthermore, the brake device can be configured so that the activation element is a knee lever or an eccentrical element, in particular an eccentrical disc or an eccentrical shaft to which the transmission element can be connected. This helps on the one hand side to implement a compact and flat configuration so that the brake device is integrable in particular into hub drives. On the other hand side controlling plural brake elements can be implement by using an eccentrical disc or an eccentrical shaft, Other configurations of the activation element are conceivable. Thus, the activation element can have a slope, a thread or any other shape.

The activation element can also be controlled directly through an electro mechanical, hydraulic, pneumatic or another element.

In particular the transmission element can be selected infinity short to provide a particularly compact configuration so that the transmission element is configured as a direct connection between the pivot bearing and the activation element.

Particularly advantageously the activation element can be moved manually and/or self-acting between a reset position and an activation position. Thus, the braking can be initiated on the one hand side by actuating a lever in an emergency situation. On the other hand, side, the brake device can be used as a locking brake. Emergency braking can be performed electronically by pre adjustable parameters as required in a particular situation e.g. when a battery fails or when the motor reaches a critical condition. This corresponds effectively to a safety brake like it is being used in wheel chair drives. Thus the activation element is spring loaded and can be opened or held open by an electro magnet or similar. The brake locks when there is no electrical current.

Furthermore, an actuatable lever or an electrically controllable actuation element, in particular an actuation motor can be used after performing emergency braking or for disengaging the locking brake. This actuation element only has to reset the activation element with a small amount of force so that the brake element is placed into a starting position which disengages the brake shoe from the contact element. The brake shoe that was previously displaced about the pivot bearing can be reset by a reset element so that the brake unit assumes its starting position again.

In another advantageous embodiment the pivot bearing can be reset by a spring element. The brake shoe that is pivot able about the pivot bearing can be disengaged from the contact with the contact element by the spring element after the activation element is moved into its reset position, which provides an automatic resetting of the brake element after disengaging the brake.

The reset element can also be a slotted link in which the brake shoe moves back into its starting position when returning the transmission element.

Particularly advantageously the transmission element can be configured L-shaped in order to provide force transmission wherein the transmission element includes at least one additional support point, in particular a support point at a slotted link. Thus, forces impacting the brake element can be distributed better or distributed to additional components of the brake unit and unexpected large operating forces can be tolerated by the brake unit. The L-arms can thus advantageously enclose a right angle but also angles greater than 90 degrees or smaller than 90 degrees between one another.

In another advantageous embodiment plural brake elements can be used in one brake unit. In order to develop maximum braking force plural brake elements can be arranged so that they move counter acting.

In a particularly advantageously embodiment, the brake shoes can have a teething wherein the plural brake elements are arranged offset relative to each other by an uneven multiple of a half width of a tooth of the teething of the brake shoes. Thus, it is assured that a tooth of a brake shoe of the brake unit immediately engages the contact element.

In order for the brake element not to cause a braking process unintentionally due to concussions or vibrations the brake unit can be received in a slotted link in an advantageous embodiment. Jolts or vibrations that impact the brake unit can thus be reacted into the slotted link which prevents a lift off or unintentional triggering of the brake device. This facilitates a defined support of the brake unit.

The brake device according to the invention can be used as a locking brake or an emergency brake in a motorized wheel chair, in particular an electric hub drive in a wheel chair.

The brake can also be used as a parking brake in motor vehicles. Automatic electrical, electrohydraulic brakes tend to fade when motor vehicles are parked at slopes for a long time. Thus the brake according to the invention can prevent a roll off when used at the drive axles.

BRIEF DESCRIPTION OF THE DRAWINGS

The invention is now subsequently described in more detail based on an embodiment with reference to drawing figures, wherein.

DETAILED DESCRIPTION OF THE INVENTION

Figure 1:
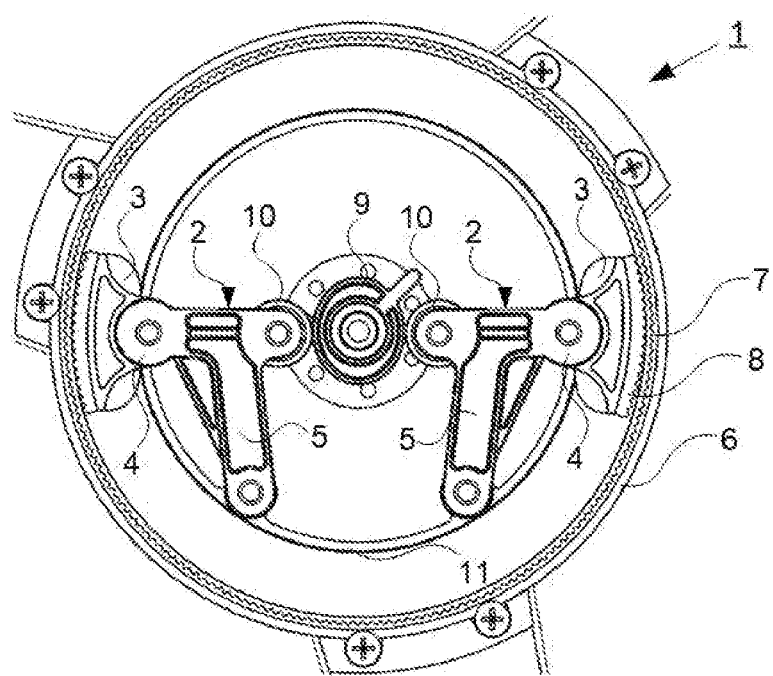
FIG. 1 illustrates a brake unit arranged in a hub motor in a sectional view.

FIG. 1 illustrates a brake unit 1 integrated in a hub drive that is used e.g.; in electrically driven wheel chairs. Two brake elements 2 that are arranged opposite to one another are arranged at a centrally located and eccentrically formed activation element 9 by rollers 10 that are supported on ball bearings. Both brake elements 2 respectively include a brake shoe 3 that is pivotably supported at a pivot bearing 4 and operatively connected through a transmission element 5 with the activation element 9. The brake shoe 3 includes an outer teething 8 wherein the arrangement is enveloped by a contact element with an inner teething 7, The outer teething 8 of the brake shoes 3 has a larger angle than an inner teething 7 of the contact element 6 so that the brake shoes 3 can roll into an extreme position on the contact element 6 after contacting the contact element 6. Additionally, the brake elements 2 are respectively operatively connected through the transmission element 5 with a slotted link 11. This reacts imparted jolts or vibrations to the slotted link 11 which prevents a lift off or an accidental actuation of the brake unit 1, Additionally, the brake shoes 3 of the brake elements 2 are offset relative to each other by an uneven multiple of a half width of a tooth of the outer teething 8 of the brake shoes 3. This assures that a tooth of the teething 8 at the brake shoe 3 can immediately engage the inner teething 7 of the contact element 6.

Figures 2A, 2B, 2C:
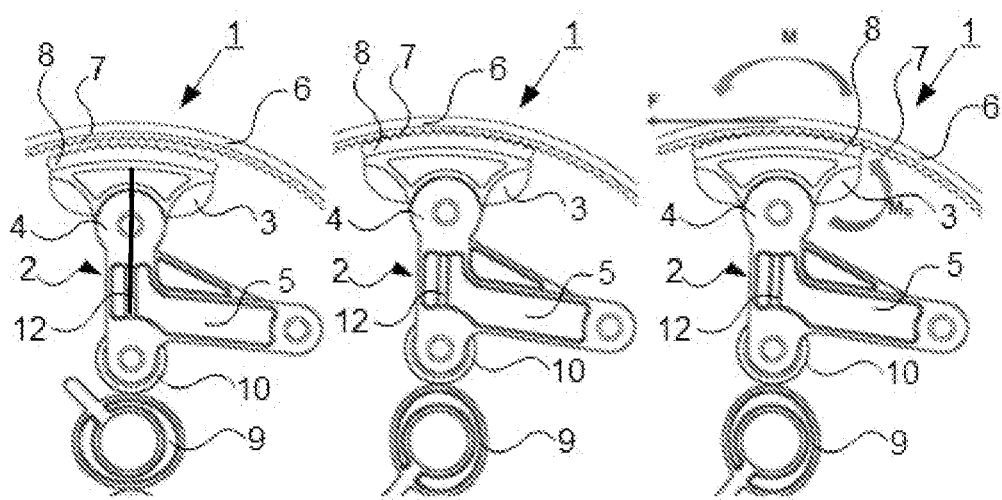
FIG. 2A illustrates a detail of the brake unit according to FIG. 1 in an unlocked position.
FIG. 2B illustrates a detail of a brake unit of the brake device according to FIG. 1 in a locked activation position.
FIG. 2C illustrates forces that come to bear in the extreme position when the brake unit according to FIG. 2B engages.

FIG. 2A illustrates a detail of the brake unit 1 according to FIG. 1 in an unlocked condition. The brake unit 1 includes a brake element 2 and an activation element 9. The brake element 2 includes a brake shoe 3 with an outer teething 8 wherein the brake shoe 3 is pivotable about a pivot bearing 4 and pivotably linked with the transmission element 5. The pivoting of the brake shoe 3 about the pivot bearing 4 is resettable by a reset element configured e.g. as a leaf spring that is fixed at the brake element 2 and at the brake shoe 3. The transmission element 5 is operatively connected with the activation element 9 by a roller 10 that is supported in a ball bearing. Thus, the contact element 6 is configured as an actuator of a hub drive and includes an inner teething 7 that is complementary to the outer teething 8 of the brake shoe 3. The activation element 9 is configured as an eccentrical element. When the brake device 1 is actuated the activation element 9 rotates about a central rotation axis so that the brake element 2 is pushed in a direction towards the contact element 6 due to an oval shape of the activation element 9 until the brake shoe 3 of the brake element 2 engages the inner teething 7 of the contact element 6 with the outer teething 8 of the brake shoe 3.

FIG. 2B illustrates a detail of the brake unit 1 according to FIG. 2A in a non actuated activation position. In the activation position the brake is not impacted by any forces from the contact element. Displacing the activation element 9 actuates the transmission element 5 and the pivot bearing 4 arranged at the transmission element 5 through the ball bearing supported roller 10 that contacts the activation element 9 wherein the pivot bearing 4 includes a pivotably supported brake shoe 3 so that the brake shoe 3 of the brake element 2 engages the inner teething 7 of the contact element 6 with the outer teething 8 of the brake shoe 3. As soon as a tooth of the outer teething 8 of the brake shoe 3 engages the inner teething 7 of the contact element 6 so that a force F is applied to the contact element 6, the engagement of the first tooth is passed on to the next tooth of the outer teething 8 of the brake shoe 3 and this step is repeated over and over with the respective adjacent tooth until the brake shoe 3 is displaced about the pivot bearing 4 so that the last tooth of the outer teething 8 of the brake shoe 3 engages the inner teething 7 of the contact element 6. In this braking position, braking forces are active.

Torques and forces M, $M_R$, F that are active when the brake shoe 3 of the brake element 2 engages the contact element 6 are shown in FIG. 2C. The torque $M_R$, is applied to the brake shoe 3 that is pivotably supported at the pivot bearing 4 through the torque M of the contact element 6 and the force F that acts in a direction of rotation of the contact element 6. Since the torque $M_R$ is generated by the force F and thus by the torque M of the contact element 6 which is caused by the torque applied to the contact element, these torques and forces are reacted or transmitted in the generation of the torque $M_R$ so that the contact element 6 comes to a standstill. Thus, the braking process in the brake device according to the invention occurs during movement, thus when a force or a torque is applied from the contact element 6 to the brake element 2.

When the brake device according to the invention is used as a locking brake, the brake shoe 3 of the brake element 2 engages the contact element 6 in an activation position caused by the rotation of the activation element 9 through the transmission element 5 and the pivot bearing 4 but the brake shoe 3 itself does not impart any pressure upon the contact element 6. This pressure is only caused by the movement of the contact element 6 according to FIG. 2C which represents a braking position or the extreme position of the brake shoe 3.

The brake device according to the invention described supra works as a locking brake as well as an emergency brake using the actual movement force for braking, while providing a compact, light and inexpensive configuration which is implemented by a brake shoe that is pivotably connected through a resettable pivot bearing.

REFERENCE NUMERALS AND DESIGNATIONS 1 brake unit
2 brake element
3 brake shoe
4 pivot bearing
5 transmission element
6 contact element
7 inner teething
8 outer teething
9 activation element
10 ball bearing supported roller
11 slotted link
12 reset element

What is claimed is:
1. A brake device of a wheelchair, the brake device comprising:
a brake unit;
a contact device engageable by the brake unit and rotatable relative to the brake unit about a center brake unit axis, wherein the brake unit includes at least one activation device rotatable about the center brake unit axis and including an eccentrical activation profile centrally arranged in the brake unit, and at least one brake member that includes a transmission member and a brake shoe that is pivotably supported in a brake shoe pivot bearing at an end of the at least one brake member so that substantially radially outward oriented forces relative to a center rotation axis of the at least one rotatable activation device and the center brake unit axis are transferable directly from the eccentrical activation profile of the at least one activation device to a roller radially displaceable by a rotation of the eccentrical activation profile and rotatably supported at the at least one brake member, wherein the radially outward oriented forces cause the brake shoe to engage the contact device, wherein the at least one activation device engages the transmission member to move the at least one brake member from an idle position towards the contact device until the brake shoe contacts the contact device in an activation position of the at least one brake member and the brake shoe, wherein the brake shoe pivot bearing is arranged at the at least one brake member so that the brake shoe pivot bearing is movable towards the contact device together with the transmission member, wherein the brake shoe is actuated from the activation position into a braking position by a transversal force imparted upon the brake shoe by the contact device wherein the transversal force acts transversal to a direction of actuation of the brake shoe pivot bearing from the idle position into the activation position, wherein the brake shoe is arranged at an end of the brake shoe pivot bearing so that a torque at the contact device and a force that acts upon the brake shoe in a direction of rotation of the contact device cause a brake shoe torque at the brake shoe and a pivoting of the brake shoe about the brake shoe pivot bearing from the activation position into the braking position, so that brake torque is transferred from the contact device to the brake unit in the braking position and no brake torque is transferred from the contact device to the brake unit in the activation position.

2. The brake device according to claim 1, wherein the brake shoe includes an outer radius that is smaller than an inner radius of the contact device.

3. The brake device according to claim 1, wherein a reset element is associated with the brake shoe that resets the brake shoe from the braking position into the activation position when the transversal force ceases or when the at least one activation device is reset.

4. The brake device according to claim 1, wherein the brake shoe and the contact device respectively include a complementary interlocking device.

5. The brake device according to claim 4, wherein the complementary interlocking device is a teething with one or plural teeth.

6. The brake device according to claim 5, wherein tooth flanks of the teething are configured flat at an angle of 45 degrees at the most.

7. The brake device according to claim 4, wherein the complementary interlocking device is a flat friction surface or a micro teething.

8. The brake device according to claim 4, wherein the complementary interlocking device is made from metal or synthetic material.

9. The brake device according to claim 1, wherein the contact device is an actuator or an actuator of a hub drive.

10. The brake device according to claim 1, wherein the at least one activation device is a knee lever or an eccentrical disc or an eccentrical shaft or a sloped plane or a thread or an activation device that is directly controllable electro mechanically, hydraulically or pneumatically.

11. The brake device according to claim 1, wherein the at least one activation device is movable between a reset position and an activation position manually or self-acting.

12. The brake device according to claim 1, wherein the pivot bearing is resettable by the reset element configured as a spring.

13. The brake device according to claim 1, wherein the transmission member is L-shaped and includes at least one support point, or at least one support point at a slotted link.

14. The brake device according to claim 1, wherein the at least one brake member incudes plural brake members that are movable counter acting.

15. The brake device according to claim 14, wherein brake shoes of the plural brake members include an outer teething and the plural brake members are circumferentially offset relative to each other by an uneven multiple of a half width of a tooth of the outer teething of the brake shoes.

16. The brake device according to claim 1, wherein the brake unit is supported in a slotted link.

17. A method, comprising:
using the brake device according to claim 1 as a locking brake or an emergency brake.

18. The brake device according to claim 1,
wherein the at least one activation device engages the roller rotatably supported at the transmission member to move the at least one brake member towards the contact device until the brake shoe contacts the contact device in the activation position of the at least one brake member and the brake shoe, and
wherein the transmission member and the brake member pivot together about a transmission member bearing that is fixed relative to the brake unit and that differs from the brake shoe pivot bearing.

19. A brake device, comprising:
a brake unit;
a contact device engageable by the brake unit and rotatable relative to the brake unit about a center brake unit axis,
wherein the brake unit includes at least one activation device rotatable about the center brake unit axis and including an eccentrical activation profile centrally arranged in the brake unit, and at least one brake member that includes a transmission member and a brake shoe that is pivotably supported in a brake shoe pivot bearing at an end of the at least one brake member so that substantially radially outward oriented forces relative to a center rotation axis of the at least one rotatable activation device and the center brake unit axis are transferable directly from the eccentrical activation profile of the at least one activation device to a roller radially displaceable by a rotation of the eccentrical activation profile and rotatably supported at the at least one brake member, wherein the radially outward oriented forces cause the brake shoe to engage the contact device,
wherein the at least one activation device engages the transmission member to move the at least one brake member from an idle position towards the contact device until the brake shoe contacts the contact device in an activation position of the at least one brake member and the brake shoe, wherein the brake shoe pivot bearing is arranged at the at least one brake member so that the brake shoe pivot bearing is movable towards the contact device together with the transmission member, wherein the brake shoe is actuated from the activation position into a braking position by a transversal force imparted upon the brake shoe by the contact device wherein the transversal force acts transversal to a direction of actuation of the brake shoe pivot bearing from the idle position into the activation position, wherein the brake shoe is arranged at an end of the brake shoe pivot bearing so that a torque at the contact device and a force that acts upon the brake shoe in a direction of rotation of the contact device cause a brake shoe torque at the brake shoe and a pivoting of the brake shoe about the brake shoe pivot bearing from the activation position into the braking position, so that brake torque is transferred from the contact device to the brake unit in the braking position and no brake torque is transferred from the contact device to the brake unit in the activation position.

20. A brake device a brake of a wheelchair or a coupling or a brake of stationary machinery or externally propelled movable equipment, the brake device comprising: a brake unit;

a contact device engageable by the brake unit and rotatable relative to the brake unit about a center brake unit axis, wherein the brake unit includes at least one activation device rotatable about the center brake unit axis and including an eccentrical activation profile centrally arranged in the brake unit, and at least one brake member that includes a transmission member and a brake shoe that is pivotably supported in a brake shoe pivot bearing at an end of the at least one brake member so that substantially radially outward oriented forces relative to a center rotation axis of the at least one rotatable activation device and the center brake unit axis are transferable directly from the eccentrical activation profile of the at least one activation device to a roller radially displaceable by a rotation of the eccentrical activation profile and rotatably supported at the at least one brake member, wherein the radially outward oriented forces cause the brake shoe to engage the contact device, wherein the at least one activation device engages the transmission member to move the at least one brake member from an idle position towards the contact device until the brake shoe contacts the contact device in an activation position of the at least one brake member and the brake shoe, wherein the brake shoe pivot bearing is arranged at the at least one brake member so that the brake shoe pivot bearing is movable towards the contact device together with the transmission member, wherein the brake shoe is actuated from the activation position into a braking position by a transversal force imparted upon the brake shoe by the contact device wherein the transversal force acts transversal to a direction of actuation of the brake shoe pivot bearing from the idle position into the activation position, wherein the brake shoe is arranged at an end of the brake shoe pivot bearing so that a torque at the contact device and a force that acts upon the brake shoe in a direction of rotation of the contact device cause a brake shoe torque at the brake shoe and a pivoting of the brake shoe about the brake shoe pivot bearing from the activation position into the braking position, so that brake torque is transferred from the contact device to the brake unit in the braking position and no brake torque is transferred from the contact device to the brake unit in the activation position.

* * * * *